US010033476B2

(12) United States Patent
Kim

(10) Patent No.: US 10,033,476 B2
(45) Date of Patent: Jul. 24, 2018

(54) APPARATUS AND METHOD FOR ACQUIRING SYNCHRONIZATION IN MOBILE COMMUNICATION SYSTEM

(75) Inventor: Ki-Soo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2590 days.

(21) Appl. No.: 11/801,564

(22) Filed: May 10, 2007

(65) Prior Publication Data
US 2008/0013659 A1 Jan. 17, 2008

(30) Foreign Application Priority Data

Jul. 12, 2006 (KR) .................. 10-2006-0065224

(51) Int. Cl.
H04B 7/00 (2006.01)
H04J 3/06 (2006.01)
(52) U.S. Cl.
CPC .................. H04J 3/0682 (2013.01)
(58) Field of Classification Search
CPC ......... H04W 56/0065; H04W 56/0035; H04W 56/005; H04W 56/0045; H04W 88/12; H04W 92/12; H04J 3/0682
USPC ................ 370/324; 455/418–420, 230, 231, 455/500–504
See application file for complete search history.

(56) References Cited

U.S. PATENT DOCUMENTS

| 7,492,754 B2* | 2/2009 | Terasawa et al. ............. 370/350 |
| 2002/0035682 A1* | 3/2002 | Niemi et al. .................. 713/151 |
| 2002/0173322 A1* | 11/2002 | Turetzky et al. ............. 455/502 |
| 2002/0197993 A1* | 12/2002 | Cho ........................ H04L 29/06 455/435.1 |
| 2003/0048811 A1* | 3/2003 | Robie, Jr. ............. H04J 3/0667 370/509 |
| 2007/0127416 A1* | 6/2007 | Terasawa ............. H04B 7/2668 370/331 |
| 2015/0215128 A1* | 7/2015 | Pal ........................ H04L 9/3228 713/155 |

FOREIGN PATENT DOCUMENTS

WO WO 00/010028 2/2000

* cited by examiner

Primary Examiner — Ronald Eisner
(74) Attorney, Agent, or Firm — The Farrell Law Firm, P.C.

(57) ABSTRACT

An apparatus and method for simultaneously executing the same event in a plurality of mobile terminals are provided. The method includes transmitting a signal to the mobile terminals and checking a transmission time point of the signal; when a response signal for the signal is received, checking a reception time point of the response signal; calculating a signal delay time using the transmission time point of the predetermined signal, the reception time point of the response signal, and an offset time contained in the response signal; and transmitting an event execution signal to the mobile terminals and executing a corresponding event, considering the offset time and the signal delay time.

12 Claims, 5 Drawing Sheets

APPARATUS AND METHOD FOR ACQUIRING SYNCHRONIZATION IN MOBILE COMMUNICATION SYSTEM

PRIORITY

This application claims priority under 35 U.S.C. § 119(a) to a Korean Patent Application filed in the Korean Intellectual Property Office on Jul. 12, 2006 and assigned Serial No. 2006-65224, the contents of which are incorporated herein by reference.

BACKGROUND OF THE INVENTION

1. Field of the Invention

The present invention relates generally to an apparatus and method for acquiring synchronization in a mobile communication system, and in particular, to an apparatus and method for acquiring synchronization in a mobile communication system in which a plurality of mobile terminals can be synchronized when the plurality of mobile terminals execute the same event at the same time.

2. Description of the Related Art

The use of mobile terminals is rapidly increasing because they are easy to carry. Service providers and terminal manufacturers are together developing mobile terminals with more convenient additional functions in order to attract potential users.

In recent years, mobile terminals have included a Bluetooth® (hereinafter, Bluetooth) module for performing communication with neighboring devices, as well as, a communication module for performing voice and data communication using Radio Frequency (RF) signals. By using the Bluetooth function, the mobile terminals are able to include various functions, for example, a wireless headset function, a music transfer function, a mobile printing function, and a file transfer function.

In addition, using the Bluetooth function, neighboring mobile terminals can execute couple events together. For example, the neighboring mobile terminals can play music files and display pictures at the same time.

FIG. 1 is a flowchart illustrating a conventional process for performing a couple event. Here, a first mobile terminal 101 transmits a couple event request signal to a second mobile terminal 103.

In FIG. 1, the first mobile terminal 101 transmits a couple event request signal to the second mobile terminal 103 in step 111.

In operation, the second mobile terminal 103 receiving the couple event request signal determines whether to execute the couple event. When the second mobile terminal 103 determines to execute the couple event, it transmits a couple event acknowledgement signal (ACK) to the first mobile terminal 101 in step 113 and executes the requested coupled event in step 115.

When the first mobile terminal 101 receives the ACK from the second mobile terminal 103, it executes the couple event in step 117.

As described above, the second mobile terminal 103 transmits the ACK and executes the couple event at the same time, while the first mobile terminal 101 executes the couple event when it receives the ACK from the second mobile terminal 103. Thus, due to the delay of the ACK (i.e., Bluetooth signal), the mobile terminals executing the couple event are not synchronized. Consequently, the mobile terminals will, for example, play a music file at a different time point and display a specific picture at a different time point.

SUMMARY OF THE INVENTION

An aspect of the present invention is to substantially solve at least the above problems and/or disadvantages and to provide at least the advantages below. Accordingly, one aspect of the present invention is to provide an apparatus and method for acquiring synchronization between mobile terminals in a mobile communication system.

Another aspect of the present invention is to provide an apparatus and method for achieving synchronization in a mobile communication system, where mobile terminals execute the same couple event simultaneously.

Another aspect of the present invention is to provide an apparatus and method for acquiring synchronization between mobile terminals executing a couple event.

Another aspect of the present invention is to provide an apparatus and method for acquiring synchronization in a mobile communication system in which mobile terminals can execute a couple event using a hyperframe number.

According to another aspect of the present invention, a method for simultaneously executing same event in a plurality of mobile terminals includes transmitting a predetermined signal to the mobile terminals and checking a transmission time point of the predetermined signal; when a response signal for the predetermined signal is received, checking a reception time point of the response signal; calculating a signal delay time using the transmission time point of the predetermined signal, the reception time point of the response signal, and an offset time contained in the response signal; and transmitting an event execution signal to the mobile terminals and executing a corresponding event, considering the offset time and the signal delay time.

According to another aspect of the present invention, a mobile terminal includes a communication module for transmitting a signal for synchronizing the mobile terminal with another mobile terminal and receiving a response signal from the another mobile terminal; and a delay checker for calculating a signal delay time between the mobile terminal and the another mobile terminal by using a transmission time point of the signal, a reception time point of the response signal, and an offset time of the another mobile terminal, which is contained in the received response signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for acquiring synchronization between mobile terminals executing the same event at the same time. A first mobile terminal and a second mobile terminal executing a couple event using a Bluetooth module will be described herein for illustrative purpose. The first mobile terminal and the second mobile terminal execute the couple event so as their respective Bluetooth modules are paired. The present invention can be applied to a plurality of mobile terminals executing an electric orchestra event at the same time.

Figure 1:
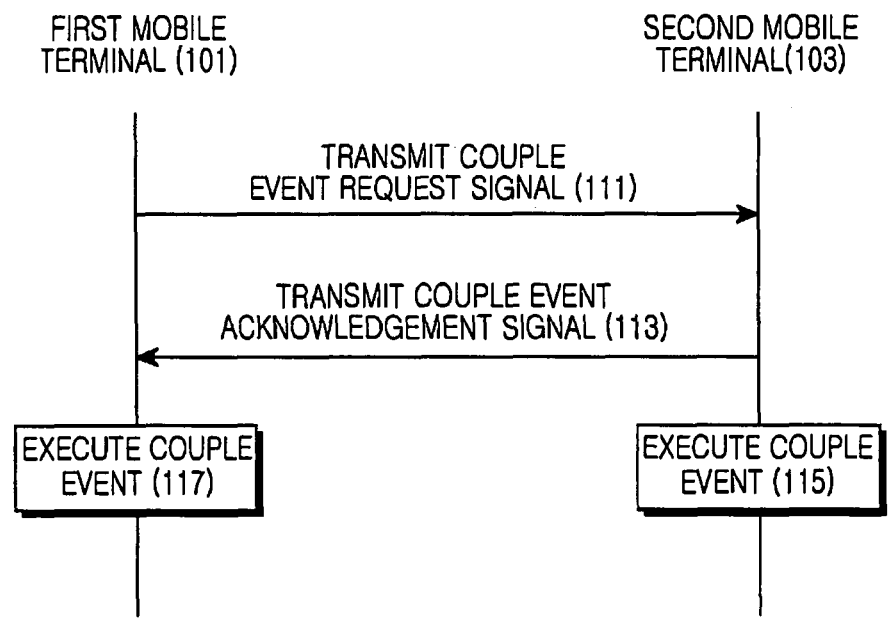
FIG. 1 is a flowchart illustrating a conventional process for executing a couple event.
Figure 2:
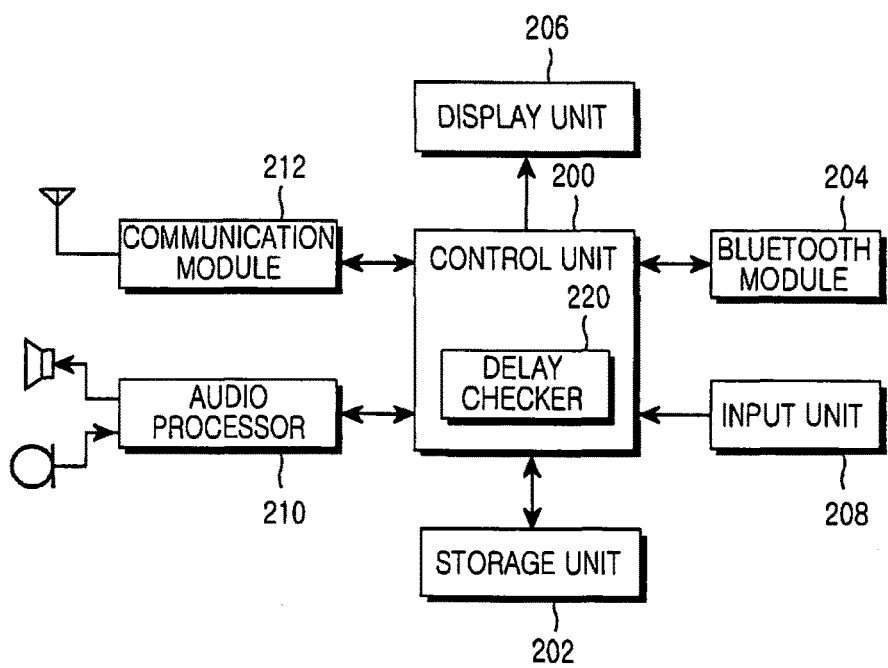
FIG. 2 is a block diagram of a mobile terminal according to the present invention.

FIG. 2 is a block diagram of a mobile terminal with a Bluetooth module according to the present invention. Examples of the mobile terminal include a cellular phone, a Personal Communication System (PCS), a Personal Data Assistant (PDA), and an International Mobile Telecommunication-2000 (IMT-2000) terminal. The following description will be made with reference to a conventional configuration of the above-described terminals.

In FIG. 2, a control unit (e.g., a microprocessor unit (MPU)) 200 controls an overall operation of the first mobile terminal. Specifically, the control unit 200 processes and controls a voice communication and a data communication. In addition, the control unit 200 includes a delay checker 220 to control synchronization with a second mobile terminal in order to execute a couple event.

The delay checker 220 checks a signal delay time between the first mobile terminal and the second mobile terminal by using a hyperframe number at a transmission time point of an echo request signal received from a Bluetooth module 204, a hyperframe number at a reception time point of an echo response signal, and an offset time information of the second mobile terminal, which is contained in the echo response signal.

A storage unit 202 stores a control program of the first mobile terminal, temporary data generated during operations of the mobile terminal, system parameters, backup data (e.g., phone numbers, SMS messages), and so on.

For the purpose of the couple event, the Bluetooth module 204 performs a Bluetooth communication with the second mobile terminal under control of the control unit 200. More specifically, the Bluetooth module 204 transmits/receives the echo signal to/from the second mobile terminal in order to acquire synchronization between the first mobile terminal and the second mobile terminal. At this point, the Bluetooth module 204 checks the hyperframe numbers at the transmission/reception time points of the echo signal and provides the check hyperframe numbers to the control unit 200.

A display unit 206 displays status information generated during operations of the mobile terminal, numbers and characters, moving pictures and still pictures, and so on. An input unit 208 includes a keypad and provides key input data to the control unit 200.

An audio processor 210 processes a voice signal that is inputted from a microphone or output to a speaker.

A communication module 212 processes the transmission/reception of an RF signal input/output through an antenna.

Figure 3:
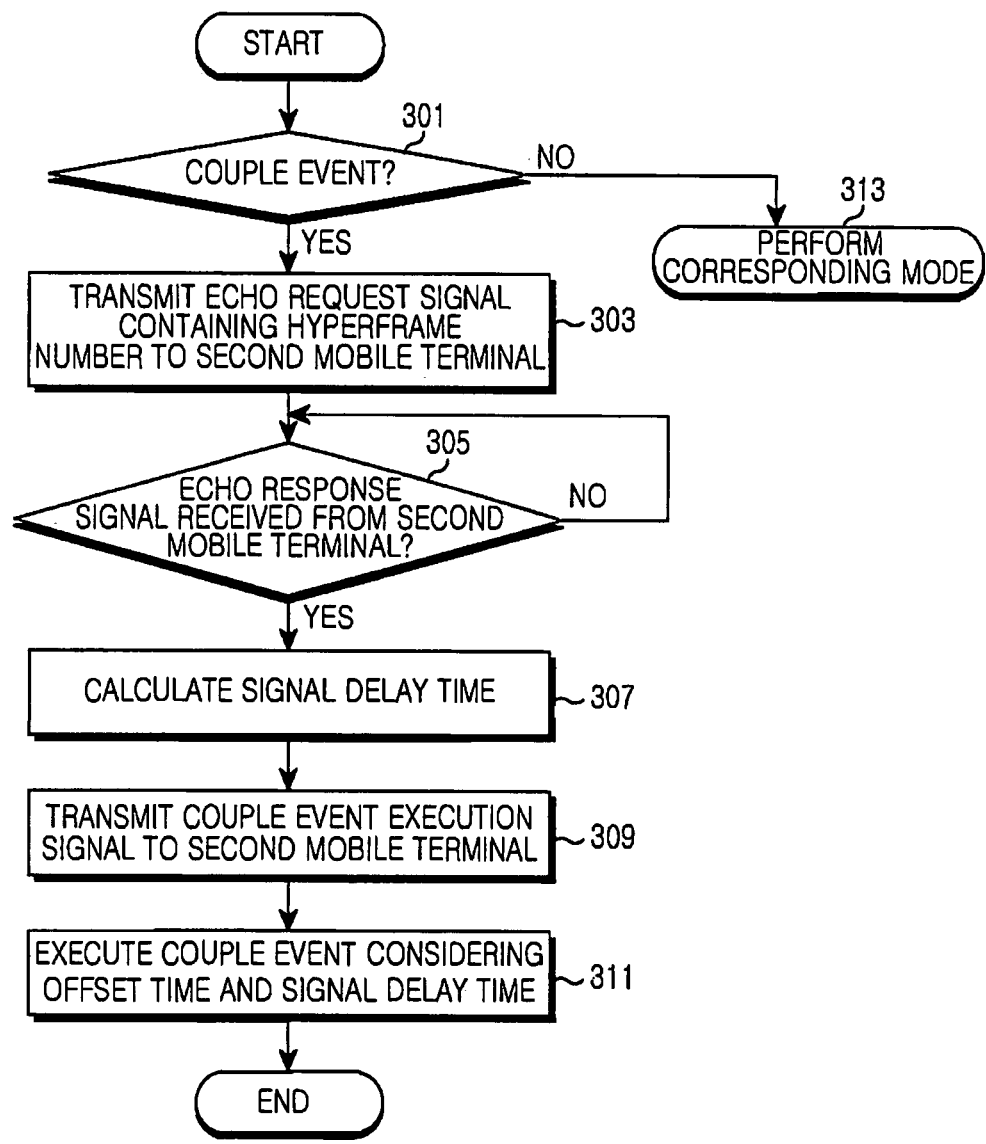
FIG. 3 is a flow diagram illustrating a process for acquiring synchronization between mobile terminals according to the present invention.

FIG. 3 is a flow diagram illustrating a process for achieving synchronization between the mobile terminals according to the present invention.

In FIG. 3, the control unit 200 determines in step 301 if a couple event mode is selected by a user's key input.

When the couple event mode is not selected, the control unit 200 performs a predetermined mode (e.g., a standby mode) in step 313.

However, when the couple event mode is selected, the control unit 200 transmits an echo request signal to the second mobile terminal in order to achieve synchronization between the first mobile terminal and the second mobile terminal in step 303. The echo request signal contains a hyperframe number at a transmission time point of the echo request signal. A signal format of the echo request signal is illustrated in FIG. 5.

Figure 5:
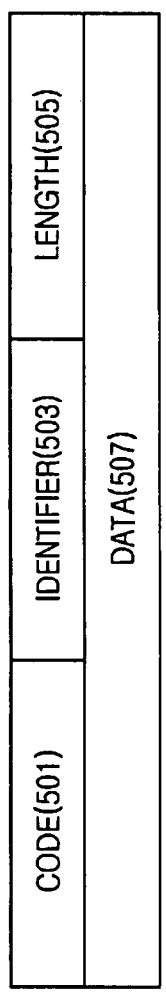
FIG. 5 is a diagram illustrating a format of a signal transmitted/received for achieving synchronization between mobile terminals.

In FIG. 5, a code field 501 contains information indicating that the signal is the echo request signal, and an identifier field 503 contains information about a mobile terminal that will receive the echo request signal. A length field 505 contains information about a total signal length, and a data field 507 contains a hyperframe number at a transmission time point of the echo request signal.

The control unit 200 determines in step 305 if an echo response signal is received from the second mobile terminal. In step 307, when the echo response signal is received from the second mobile terminal, the control unit 200 calculates a signal delay time by using information contained in the echo response signal and a hyperframe number at a reception time point of the echo response signal. The information contained in the echo response signal represents a sum of the hyperframe number contained in the echo request signal and an offset time information of the second mobile terminal. Therefore, the signal delay time is calculated using Equation (1):

$$\text{Signal Delay Time} = (FN\_B' - FN\_A)/2 \quad (1)$$

where FN_B' represents the hyperframe number at the reception time point of the echo response signal, and FN_A represents the information contained in the echo response signal and is expressed as a sum of the hyperframe number (FN_B) at the transmission time point of the echo request signal and the offset time of the second mobile terminal, i.e., FN_A=FN_B+OFFSET.

After calculating the signal delay time, the control unit 200 performs step 309 to transmit a couple event execution signal to the second mobile terminal.

The control unit 200 performs step 311 to execute the couple event, considering the calculated signal delay time and the offset time of the second mobile terminal. Specifically, the control unit 200 transmits the couple event execution signal to the second mobile terminal, counts the hyperframe by the calculated signal delay time and the offset time of the second mobile terminal, and executes the couple event. Then, the control unit 200 terminates the process.

Figure 4:
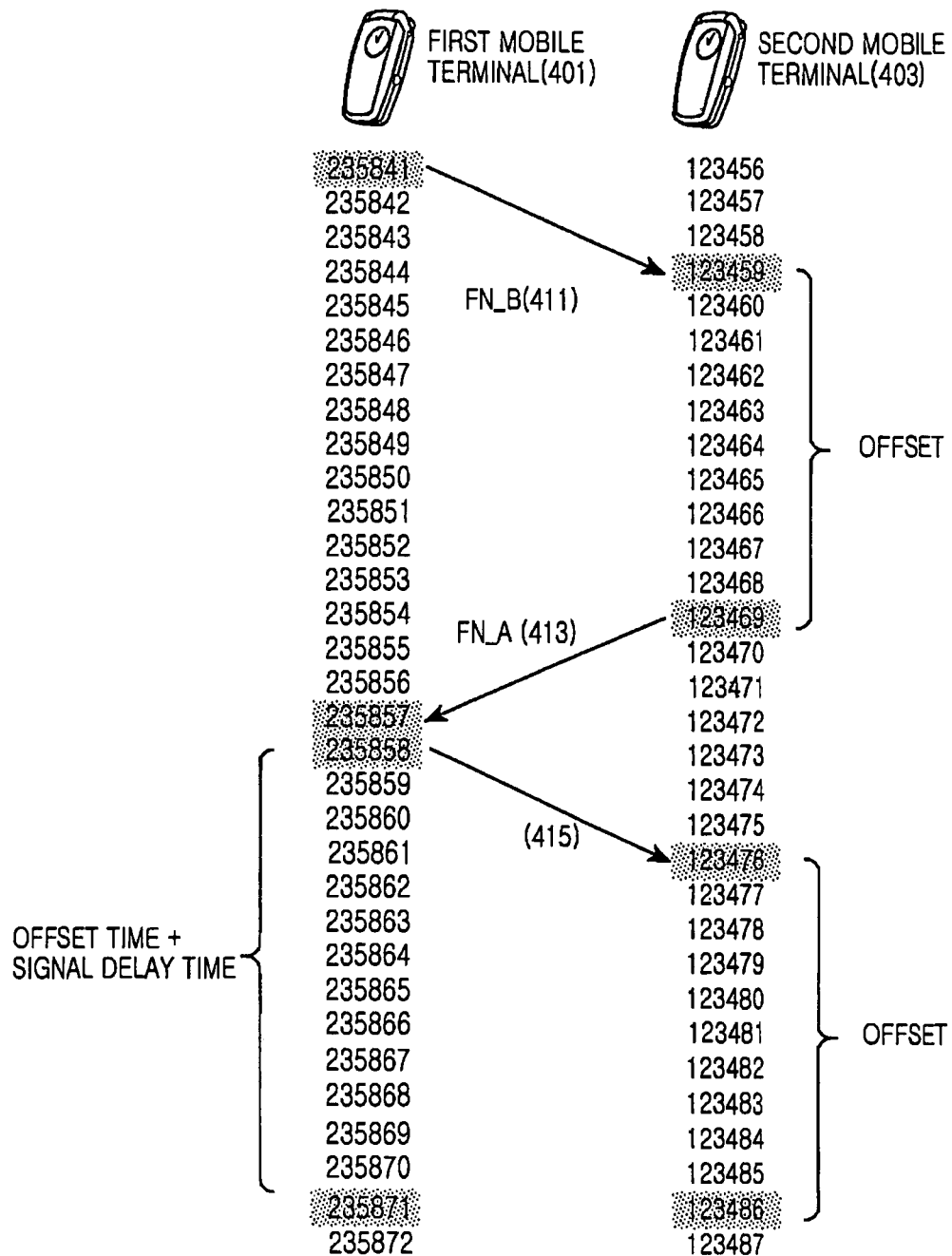
FIG. 4 is a diagram illustrating a process for executing a couple event according to the present invention.

FIG. 4 is a diagram illustrating a procedure for executing the couple event according to the present invention.

In FIG. 4, in step 411, the first mobile terminal 401 transmits to the second mobile terminal 403 the echo request signal containing the hyperframe number (e.g., 235841) in order to execute the couple event in synchronization with the second mobile terminal 403. The hyperframe number means a hyperframe number at a transmission time point of the echo request signal.

In step 413, when the second mobile terminal 403 receives the echo request signal from the first mobile terminal 401, it performs an internal operation to transmit to the first mobile terminal 401 the echo response signal containing the offset time information (e.g., 10) after the offset time. The echo response signal contains the sum of the hyperframe number contained in the echo request signal and the offset time. The offset time is checked by an increment of the hyperframe number from the time point when the second mobile terminal receives the echo request signal to the time point when the second mobile terminal transmits the echo response signal. A signal format of the echo response signal is illustrated in FIG. 5.

In FIG. 5, a code field 501 contains information indicating that the signal is the echo response signal, and an identifier field 503 contains information about a mobile terminal that will receive the echo response signal. A length field 505 contains information about a total signal length, and a data field 507 contains the sum of the hyperframe number contained in the echo request signal and the offset time of the second mobile terminal.

When the first mobile terminal 401 receives the echo response signal from the second mobile terminal 403, it calculates the signal delay time by using the information contained in the echo response signal and the hyperframe number at the reception time point of the echo response signal. The information contained in the echo response signal represents the sum of the hyperframe number contained in the echo request signal and the offset time of the second mobile terminal.

For example, as illustrated in FIG. 4, when the hyperframe number when the echo response signal is received is 235857; the offset time contained in the echo response signal is 10; and the hyperframe number at the time point when the echo request signal is transmitted is 235841, the signal delay time calculated using Equation (1) is 3 (={235857−(235841+10)}/2).

In step 415, the first mobile terminal 401 transmits the couple event execution signal to the second mobile terminal 403 and executes the couple event, considering the offset time of the second mobile terminal 403 and the signal delay time. When the second mobile terminal 403 receives the couple event execution signal, it executes the couple event after the offset time.

In one embodiment, the signal delay time is calculated using the hyperframe number and the offset time contained in the echo response signal and the hyperframe number at the time point when the echo response signal is received. The hyperframe number contained in the echo response signal means the hyperframe number contained in the echo request signal at the time point when the echo request signal is transmitted. Even when the hyperframe number at the time point when the echo request signal is transmitted is stored without being contained in the echo request signal, the signal delay time can also be calculated in the same manner. As a result, the capacity of the echo signal transmitted/received can be reduced because the hyperframe number is not contained in the echo request signal and the echo response signal.

Alternate embodiments of the present invention can also comprise computer readable codes on a computer readable medium. The computer readable medium includes any data storage device that can store data that can be read by a computer system. Examples of a computer readable medium include magnetic storage media (such as ROMs, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, the mobile terminals communicate with each other by acquiring the signal delay time and the offset time information using the hyperframe number in order to execute the couple event or electronic orchestra event at the same time. Therefore, the mobile terminals can execute the event simultaneously and accurately because one mobile terminal is synchronized with the other.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for executing an event of a mobile terminal, comprising:
   transmitting a signal to a second mobile terminal;
   receiving, from the second mobile terminal, a response signal corresponding to the signal;
   detecting a signal delay time based on a transmission time point of the signal, a reception time point of the response signal, and an offset time contained in the response signal;
   transmitting an event execution signal for an event to the second mobile terminal; and
   executing the event, considering the offset time and the signal delay time, for simultaneous execution of the event with the second mobile terminal,
   wherein the offset time indicates a processing delay time of the second mobile terminal.

2. The method of claim 1, wherein the transmission time point of the signal, the reception time point of the response signal, and the offset time are checked using a hyperframe.

3. The method of claim 1, wherein the transmission time point of the signal includes:
   a hyperframe number at the transmission time point of the signal.

4. The method of claim 3, wherein detecting the signal delay time comprises:
   identifying the hyperframe number at the transmission time point of the signal;
   identifying the offset time contained in the response signal; and
   calculating the signal delay time based on the hyperframe number at the reception time point of the response signal, the hyperframe number at the transmission time point of the signal, and the offset time contained in the response signal.

5. The method of claim 1, wherein the signal includes a hyperframe number at the transmission time point.

6. The method of claim 5, wherein the response signal includes information about a sum of the hyperframe number contained in the signal and the offset time of the mobile terminal.

7. The method of claim 6, wherein detecting the signal delay time comprises:
   identifying information about a sum of a hyperframe number contained in the response signal and the offset time; and
   calculating the signal delay time based on the hyperframe number at the time point of the response signal and information about a sum of the hyperframe number and the offset time.

8. The method of claim 1, wherein when the event execution signal is transmitted, the event is executed after the hyperframe number is counted by the signal delay time and the offset time.

9. A mobile terminal, comprising:
a communication interface; and
a processor configured to:
control the communication interface to transmit a signal to a second mobile terminal and receive, from the second mobile terminal, a response signal corresponding to the signal;
detect a signal delay time between the mobile terminal and the second mobile terminal by using a transmission time point of the signal, a reception time point of the response signal, and an offset time of the second mobile terminal, which is contained in the received response signal; and
execute an event in synchronization with the second mobile terminal by using the offset time and the signal delay time,
wherein the offset time indicates a processing delay time of the second mobile terminal.

10. The mobile terminal of claim 9, wherein the offset time, the transmission time point of the reception time point of the response signal, and the transmission time signal of the signal are checked using a hyperframe.

11. A non-transitory computer-readable recording medium having recorded thereon a program for executing an event of a mobile terminal, comprising:

a first code segment, for transmitting a signal to a second mobile terminal;
a second code segment, for receiving, from the second mobile terminal, a response signal corresponding to the signal;
a third code segment, for detecting a signal delay time based on a transmission time point of the signal, a reception time point of the response signal, and an offset time contained in the response signal;
a fourth code segment, for transmitting an event execution signal for an event to the second mobile terminal; and
a fifth code segment, for executing the event, considering the offset time and the signal delay time, for simultaneous execution of the event with the second mobile terminal,
wherein the offset time indicates a processing delay time of the second mobile terminal.

12. The mobile terminal of claim 10, wherein the processor is configured to check a stored hyperframe number at the transmission time point of the signal, checks the offset time contained in the response signal, and calculates the signal delay time using the hyperframe number at the reception time point of the response signal, the hyperframe number at the transmission time point of the signal, and the offset time contained in the response signal.

* * * * *